United States Patent [19]

Temme

[11] 4,312,442
[45] Jan. 26, 1982

[54] SCRAPER-CHAIN CONVEYOR

[75] Inventor: Helmut Temme, Waltrop, Fed. Rep. of Germany

[73] Assignee: Gewerkschaft Eisenhutte Westfalia, Fed. Rep. of Germany

[21] Appl. No.: 125,513

[22] Filed: Feb. 28, 1980

[30] Foreign Application Priority Data

Mar. 2, 1979 [DE] Fed. Rep. of Germany ....... 2908155

[51] Int. Cl.³ ............................................. B65G 19/18
[52] U.S. Cl. .................................... 198/561; 198/585; 198/728; 198/831
[58] Field of Search ............... 198/725, 728, 729, 733, 198/735, 831, 561, 585, 839

[56] References Cited

U.S. PATENT DOCUMENTS

| 453,130 | 5/1891 | Ritscher | 198/561 |
| 2,940,424 | 6/1960 | Rose et al. | 198/733 X |
| 3,905,473 | 9/1975 | Jones et al. | 198/733 X |

FOREIGN PATENT DOCUMENTS

| 2013089 | 10/1971 | Fed. Rep. of Germany | 198/728 |
| 2051384 | 4/1972 | Fed. Rep. of Germany | 198/729 |
| 1278335 | 6/1972 | United Kingdom | 198/585 |

Primary Examiner—Jeffrey V. Nase
Attorney, Agent, or Firm—Thompson, Birch, Gauthier & Samuels

[57] ABSTRACT

A scraper-chain conveyor has a scraper assembly and plurality of channel sections defining upper and lower runs for the scraper assembly. The scraper assembly passes round sprocket drums positioned at the ends of the conveyor, and is constituted by two drive chains and a plurality of scrapers connected thereto. The conveyor has first and second straight portions joined by a curved portion. The upper run of the curved conveyor portion is at a lower level than the upper run of the adjacent end of the first straight conveyor portion. The scraper assembly passes between the upper runs of said end of the first straight conveyor portion and the curved conveyor portion via upper and lower deflector rollers which direct the scraper assembly in a Z-shaped path. The upper deflector roller is provided with a drive, whereby the chain tension of the scraper assembly is negligible when the assembly passes round the curved portion.

13 Claims, 2 Drawing Figures

SCRAPER-CHAIN CONVEYOR

BACKGROUND OF THE INVENTION

This invention relates to a scraper-chain conveyor having first and second straight portions joined by a curved portion.

A scraper-chain conveyor of this construction is used to convey won mineral material from a longwall face directly into the roadway at the "downstream" end of the longwall working. In order to guide the scrapers of the conveyor round the curved conveyor portion, it is standard practice to use a special type of guide assembly positioned at the inside of the curve. Such a guide assembly usually has a pair of pulley wheels which are independently rotatable about a vertical axis. The diameter of each of the pulley wheels is the same as that of the inside of the curved conveyor portion, and the rims of the pulley wheels engage the adjacent ends of the scrapers. (See Gluckauf, 1976, pages 873 to 877; DE-PS 20 65 424; DE-PS 20 51 384).

Unfortunately, the scraper assembly can only be adequately guided by such an assembly, if at least four scrapers are always in engagement with each of the pulley wheels. This means that the scrapers must be fitted relatively closely together on their drive chain or chains. Another disadvantage of this type of guide assembly is that its large dimensions make it difficult to move under the roof of the mine working in the critical region where the longwall face meets the roadway. A further disadvantage is that, in order to take up the very large forces arising from the tension in the drive chain(s) in the region of the curved conveyor portion, the entire guide assembly must be of a very robust and stable construction. This results in a very heavy and bulky unit. As the guide assembly has to be advanced together with the conveyor (to follow up the advance of the face) this results in the advance of the conveyor being unduly difficult and complicated.

The aim of the invention is to provide a conveyor of the initially stated type which can be used without a guide assembly, or with a guide assembly of relatively light construction.

SUMMARY OF THE INVENTION

The present invention provides a scraper-chain conveyor having a scraper assembly and plurality of channel sections defining upper and lower runs for the scraper assembly, the scraper assembly passing round sprocket drums positioned at the ends of the conveyor and being constituted by drive chain means and a plurality of scrapers connected thereto, the conveyor having first and second straight portions joined by a curved portion, wherein the upper run of the curved conveyor portion is at a lower level than the upper run of the adjacent end of the first straight conveyor portion, and wherein the scraper assembly passes between the upper runs of said end of the first straight conveyor portion and the curved conveyor portion via upper and lower deflector rollers which direct the scraper assembly in a Z-shaped path, one of the deflector rollers being a drive roller.

Since a drive (the drive roller) is arranged a short distance "upstream" of the curved conveyor portion, the chain tension in the region of the curved conveyor portion is negligible, so that there is no need for a guide assembly. If a guide assembly is considered necessary, it can be of relatively light and simple construction.

Advantageously, the upper run of the first straight conveyor portion rises towards said end, the major portion of the first straight conveyor portion being at the same level as the curved conveyor portion and the second straight conveyor portion.

The upper deflector roller may be the drive roller and be positioned nearer to the curved portion than the lower deflector roller. Preferably, the upper deflector roller is positioned directly above the upper run of the curved conveyor portion, and the lower deflector roller is biassed away from the curved conveyor portion. This biassing of the lower deflector roller prevents the drive chain means sagging in the zone of the Z-shaped path.

Preferably, the deflector rollers are sprocket drums housed within a drive station at said end of the first straight conveyor portion, the drive station supporting a drive for the drive roller.

Advantageously, each of the scrapers of the scraper assembly is attached to the drive chain means at its centre, and the drive chain means is constituted by two drive chains.

The sprocket drum at the end of the second straight conveyor portion may be provided with a drive which is less powerful than the drive for sprocket drum which constitutes the drive roller.

The drive station may have a one-piece or two-piece drive frame. In either case, the drive frame may be joined to the adjacent channel section of the first straight conveyor portion by means of at least one intermediate channel section whose floor rises towards the drive frame. Similarly, the drive frame may be joined to the curved conveyor portion by means of at least one intermediate channel section.

BRIEF DESCRIPTION OF THE DRAWINGS

A conveyor constructed in accordance with the invention will now be described, by way of example, with reference to the accompanying drawings in which.

DESCRIPTION OF PREFERRED EMBODIMENT

Figure 1:
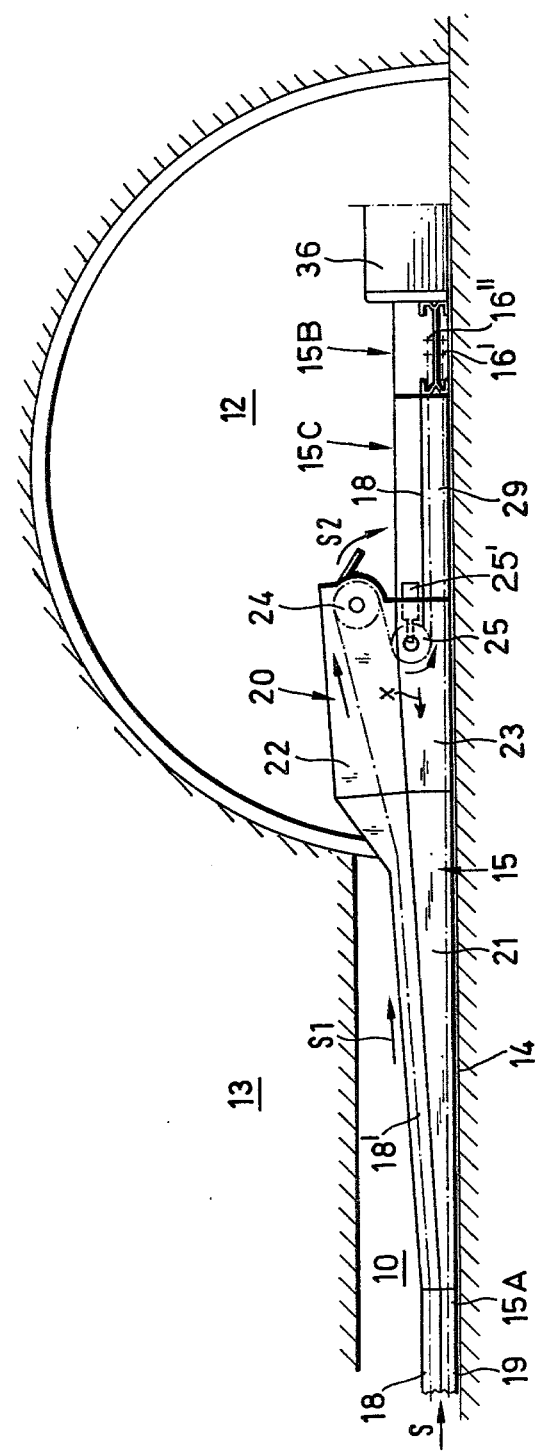
FIG. 1 is a schematic side elevation of the conveyor in the end zone where a longwall working meets a roadway.
Figure 2:
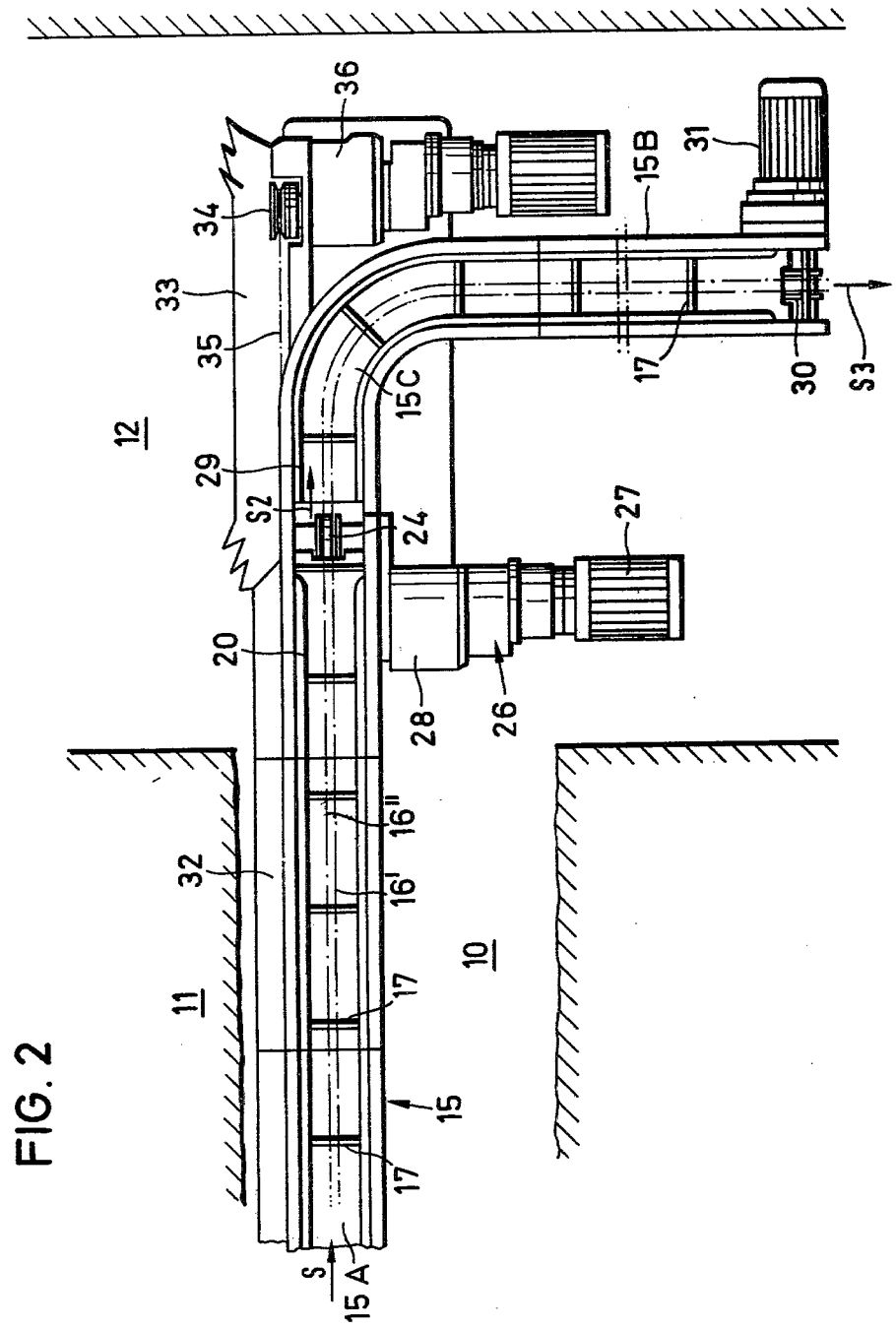
FIG. 2 is a plan view of the conveyor shown in FIG. 1.

Referring to the drawings, FIGS. 1 and 2 show one end of a longwall working 10 having a face 11 from which coal (or other mineral material) is to be won. At its end, the longwall working 10 meets a roadway 12. The longwall working 10 has a roof 13 and a floor 14.

A scraper-chain conveyor 15 is provided to transfer won coal from the longwall working 10 to the roadway 12, the conveyor having a first straight portion 15A extending along the longwall working, a second straight portion 15B extending along the roadway, and a curved portion 15C interconnecting the two straight portions. The curved portion 15C of the conveyor 15 curves through an angle of 90° C. The conveyor is constituted by a plurality of channel sections joined end-to-end, and a scraper assembly constituted by a double drive chain 16', 16" and a plurality of scrapers 17. The channel sections are joined together so as to permit limited articulation between adjacent sections whilst resisting tensile forces. The drive chains 16' and 16" are positioned at the middle of the scrapers 17, so that the conveyor 15 is a double middle scraper-chain conveyor. The scrapers 17 move the won coal along the channel sections in the upper, conveying run 18 of the conveyor 15, whereas no coal is moved in the lower, return run 19.

As shown in FIG. 1, the upper run 18 of the conveyor 15 rises gradually as the first straight portion 15A approaches the curved portion 15C. This rising portion 18' terminates at a drive station 20 which is located immediately upstream of the curved portion 15C. The rising portion 18' of the upper run 18 of the conveyor 15 is formed by one or more special channel sections 21 which interconnect the channel sections of the portion 15A and the drive station 20.

The drive station 20 has a two-piece drive frame constituted by an upper frame 22 which is firmly mounted as a lower frame 23. Alternatively, the drive station 20 may have a one-piece drive frame. The drive station 20 rotatably supports a pair of deflecting rollers 24 and 25 around which the scraper assembly 16, 16' and 17 is deflected in a Z-loop (as shown by the unreferenced arrows in FIG. 1). Sprocket drums constitute the deflecting rollers 24 and 25, the upper sprocket drum 24 being rotatably supported within the upper frame 22, and the lower sprocket drum 25 being rotatably supported within the lower frame 23 "upstream" of the upper sprocket drum. The upper sprocket drum 24 is provided with a drive 26 (see FIG. 2, the drive being omitted from FIG. 1 for reasons of clarity). The drive 26 has a drive motor 27 (for example an electric motor) which powers the upper sprocket drum 24 via a gear box 28. The drive 26, is attached to the goaf side of the drive station 20, and is supported on the floor 14 by means of skids (not shown). The upper sprocket drum 24 is disposed above the upper run 18 of an intermediate channel section 29 which is positioned between the drive station 20 and the curved conveyor portion 15C.

At the end of the conveyor portion 15B remote from the curved conveyor portion 15C, a sprocket drum 30 is provided. The drum 30 is provided with a drive 31 and serves to drive the scraper assembly 16', 16" and 17 along the conveyor portions 15B and 15C as well as diverting the scraper assembly from its upper run 18 to its lower run 19. As indicated by the arrow S3, the drum 30 discharges coal to a belt conveyor (not shown), which carries the coal away along the roadway 12. The drive 31 is considerably less powerful than the drive 26, since the drive 31 has to move the scraper assembly 16', 16" and 12 only along the conveyor portions 15 and 15C which are much shorter than the length of the conveyor portion 15A (that is to say the length of the longwall working 10) along which the scraper assembly is driven by the drive 26.

The opposite end of the conveyor portion 15A (that is to say at the other end of the longwall working 10), is provided with an auxiliary drive (not shown) which powers an auxiliary sprocket drum (not shown) for driving the scraper assembly 16', 16" and 17.

The coal won from the face 11 and loaded onto the conveyor portion 15A is carried along this portion in the direction of the arrow S. It is then carried up the inclined channel section(s) 21 (as indicated by the arrow S1), over the upper sprocket drum 24 and onto the upper run 18 of the intermediate channel section 29 (as indicated by the arrow S2). The coal is then carried by the scraper assembly 16', 16" and 17 around the curved conveyor portion 15C, along the straight conveyor portion 15B, and is then ejected (as indicated by the arrow S3) over the drum 30 onto the downstream belt conveyor.

Since the main drive drum 24 of the scraper assembly 16', 16" and 17 is located immediately upstream of the curved conveyor portion 15C, the tension of the scraper assembly is negligible as it passes along the curved conveyor portion. Thus, there is no need for a pulley-wheel guide assembly for supporting and guiding the scrapers 17 as they move round the curved conveyor portion 15C.

In order to prevent the chains 16' and 16" sagging as they move round the Z-loop, the lower sprocket drum 25 is spring-biassed in the direction of the arrow X (see FIG. 1). This biasing means is shown in FIG. 1 at 25' and can be supplemented (or replaced) by a hydraulic tensioning arm. Obviously the lower sprocket drum 25 is mounted within the lower frame 23 so as to be movable in the direction of the arrow X.

A plough guide 32 is mounted on the face side of the conveyor portion 15A, and extends into the roadway 12. Consequently, a plough 33, which is reciprocally drivable along the guide 32, can move along the entire length of the longwall face 11 and into the roadway 12. Thus, there is no need for a stable hole to be provided. The plough 33 is driven, via a sprocket wheel 34 and a plough drive chain 35, by means of a drive 36 which is positioned alongside the conveyor portion 15B within the roadway 12.

It will be apparent that a number of modifications could be made to the conveyor described above. In particular the curved conveyor portion 15C could be provided with a pulley-wheel guide assembly to assist with the guidance of the scrapers 17 round the 90° C. curve. However, such a guide assembly could be of relatively light and simple construction and so would avoid the disadvantages of the known guide assemblies.

I claim:

1. A scraper-chain conveyor for transporting mineral material, comprising:

an endless scraper asaembly constituted by drive chain means with a plurality of scrapers connected thereto, said scraper assembly being arranged to pass around sprocket drums positioned at the ends of the conveyor and having upper and lower runs guided by a plurality of channel sections, at least said upper run having first and second angularly disposed straight portions joined by a curved portion, with the level of said curved portion being lower than that of an adjacent elevated end of said first straight portion;

upper and lower deflector rollers positioned to direct said upper run from said elevated end to said curved portion in a vertically aligned generally Z-shaped path, the position of said upper deflector roller being such that mineral material being transported along said first straight section drops from said elevated end onto said upper run at the level of said curved portion for continued transport along said curved portion and said second straight portion, one of said deflector rollers being a drive roller.

2. A conveyor according to claim 1, wherein the first straight portion of said upper run rises towards said elevated end, the major portion of said first straight portion being at the same level as the curved portion and the second straight portion of said upper run.

3. A conveyor according to claim 1, wherein the upper deflector roller is the drive roller and is positioned nearer to the curved portion of said upper run than the lower deflector roller.

4. A conveyor according to claim 3, wherein the upper deflector roller is positioned directly above the curved portion of said upper run.

5. A conveyor according to claim 1, further comprising means for biasing the lower deflector roller away from said curved portion.

6. A conveyor according to claim 1, wherein each of the scrapers of the scraper assembly is attached to the drive chain means at its centre.

7. A conveyor according to claim 6, wherein the drive chain means is constituted by two drive chains.

8. A conveyor according to claim 1, wherein the deflector rollers are sprocket drums housed within a drive station at said end of the first straight portion of said upper run, the drive station supporting a drive for the drive roller.

9. A conveyor according to claim 8, wherein the sprocket drum at the end of the second straight portion of said upper run is provided with a drive.

10. A conveyor according to claim 9, wherein the drive for said sprocket drum at the end of the second straight portion is less powerful than the drive for the sprocket drum which constitutes the drive roller.

11. A conveyor according to claim 8, wherein the drive station has a two-piece drive frame.

12. A conveyor according to claim 11, wherein the drive frame is joined to said adjacent channel section of the first straight portion by means of at least one intermediate channel section whose floor rises towards the drive frame.

13. A conveyor according to claim 11, wherein the drive frame is joined to the adjacent channel section of said curved portion by means of at least one intermediate channel section.

* * * * *